United States Patent [19]

Pusch et al.

[11] 4,300,160
[45] Nov. 10, 1981

[54] THERMAL IMAGING DEVICE FOR DETECTING AND IDENTIFYING A THERMAL OBJECT

[75] Inventors: Günter Pusch, Neckargemünd-Dilsberg; Alexander Hoffmann, Mauer, both of Fed. Rep. of Germany

[73] Assignee: U.S. Philips Corporation, New York, N.Y.

[21] Appl. No.: 91,851

[22] Filed: Nov. 6, 1979

[30] Foreign Application Priority Data

Nov. 8, 1978 [DE] Fed. Rep. of Germany ....... 2848325

[51] Int. Cl.³ ............................................. H04N 3/08
[52] U.S. Cl. .................................... 358/113; 358/206; 250/334; 350/6.8; 350/486
[58] Field of Search ................. 358/113, 206; 250/334; 350/6.8, 285

[56] References Cited

U.S. PATENT DOCUMENTS

| 3,617,106 | 11/1971 | Bjork | 358/113 |
| 4,246,612 | 1/1981 | Berry | 358/206 |

FOREIGN PATENT DOCUMENTS 2510733  9/1976  Fed. Rep. of Germany .
2623373  12/1977  Fed. Rep. of Germany .

Primary Examiner—Howard Britton
Attorney, Agent, or Firm—Marc D. Schechter

[57] ABSTRACT

The thermal imaging device comprises an IR-transmitting scanning polygon arranged behind an objective system. The polygon rotates about two mutually perpendicular axes, i.e. about the optical axis of the device and about the axis of rotation of the scanning polygon which is perpendicular thereto. The rays which emerge from the polygon pass through a reversing optic, which also rotates about the optical axis but with half the angular frequency of the scanning polygon around this axis. Behind this a multichannel IR detector array is arranged, to which a multichannel summing amplifier is connected. The amplifier is synchronized with the frequency of the rotation of the scanning polygon about its own axis. This rotation of the scanning polygon at the same time constitutes the radial deflection frequency for displaying the image.

5 Claims, 5 Drawing Figures

THERMAL IMAGING DEVICE FOR DETECTING AND IDENTIFYING A THERMAL OBJECT

BACKGROUND OF THE INVENTION

The invention relates to a thermal imaging device for detecting and identifying a thermal object, comprising a rotating IR-transmitting (infrared-transmitting) scanning polygon arranged behind an objective system. The rays which emerge from the polygon are incident on a sensor array which produces electrical signals. The electrical signals are then converted into visible images.

German patent application No. 25 10 733 describes a device for the electronic reconstruction of thermal images. In this device the image, which is focused by means of an IR objective, is scanned with the aid of a rotating IR-transmitting scanning polygon. The scanning polygon is arranged in front of an IR detector array. The electrical signal voltages supplied by the detectors drive light-emitting diodes whose emergent rays, after passing through another polygon which rotates in conformity with the scanning polygon, form an optical image of the thermal scene being observed. In this case the scene is scanned in Cartesian coordinates, the polygon scanning in one coordinate direction only.

From German patent application No. 26 23 373 it is furthermore known to scan a scene observed via an IR objective by means of a pivotable mirror, reversing optics and two prisms which rotate in conformity with each other in Cartesian and polar coordinates. Such an arrangement facilitates the identification of separate objects in the complete IR scene after the detected IR signals have been made visible.

Instead of ocular observation it is also possible to visually display the thermal image on a screen for example on the screen of a picture tube after appropriate signal conversion. Such a device enables one to scan and optically reconstruct the IR scene in two coordinate systems. On the other hand the alignment and control of a mirror demand more mechanical provisions in order to guarantee the necessary accuracy and quality of the derived electronic signals, on which in turn the identification of the thermal objects depends.

SUMMARY OF THE INVENTION

It is an object of the invention to provide a precision mechanical and electrical device of the type described above, which can be simply adapted in an optical respect and which complies with the most stringent accuracy requirements in respect of the IR objects to be selected from a detected scene and in respect of the electronic signals required for the display.

The thermal imaging device according to the invention includes a scanning polygon, which rotates about two axes one of which is the optical axis of the device, which are perpendicular to each other. The polygon is located between a correction lens and a lens system with a reversing optic. The reversing optic rotates about the optical axis at half the angular frequency at which the polygon rotates about the optical axis. Behind the reversing optic and lens system is a signal-receiving stationary IR detector array. A multichannel summing amplifier for producing the signal voltages for a picture tube, is connected to the IR detector array. The amplifier is synchronized with the rotation of the scanning polygon around the axis which is perpendicular to the optical axis. This rotation frequency constitutes the radial deflection frequency.

In order to meet the various geometric resolution requirements depending on the field of view of an image, neither the objective, the scanning system, nor the detector need be varied, so that the device can be of a mechanically and electrically simple and compact construction.

By means of the novel device it is furthermore possible to obtain a smooth transition from the identification field of view to the recognition field of view. This feature substantially facilitates the operation of the device. When the entrance optic is for example a pivotable or rotatable periscope, it need only be pivoted in order to center an object which is initially situated at the edge of the picture, so that it can be identified more easily. The magnification on a display can be effected continuously, the picture not disappearing temporarily, but merely being blown up so to speak.

A further advantage of the polar scanning realized by means of the device according to the invention is that objects to be identified, i.e. which have been centered, are not only scanned from one direction, they are scanned more completely from all directions as the center is approached. As a result of this, edge and line-shaped detail structures (e.g. gun barrels), regardless of the angles at which they appear in the thermal image, are temporarily disposed exactly at right angles to the scanning device, the real angle assuming an ideal value. All detail structures, which otherwise could disappear within the line structure of an image, are thus transmitted. Owing to the high information density at the center of the picture, the reliability of the reproduction is also increased, which is of significance in the event of a failure of individual detector elements, because all image points are scanned at least twice, in the center for example 50 times, for up to half the field of view.

The invention is especially advantageous when used as an aiming device, because the optical axis can be used as a convenient marking facility. In the invention, the central element of the line being scanned is unblanked, so that on a display a star is generated on the optical axis. Thus the problem of axis harmonization has essentially been reduced to the stability of the detector via the scanning device.

An optimization of the entrance objective is not necessary for the entire image field, but only for the inner part employed for identification, so that smaller numerical apertures can be realized than in the case of images which should exhibit a constantly high geometrical resolution over the entire image field.

Furthermore, when normally cooled IR detectors are employed, temperature contrasts of approximately 1° K in different fields of view can be detected without varying or changing the objective.

BRIEF DESCRIPTION OF THE DRAWING

The invention will now be described with reference to the drawing.

DESCRIPTION OF THE PREFERRED EMBODIMENTS

Figure 1:
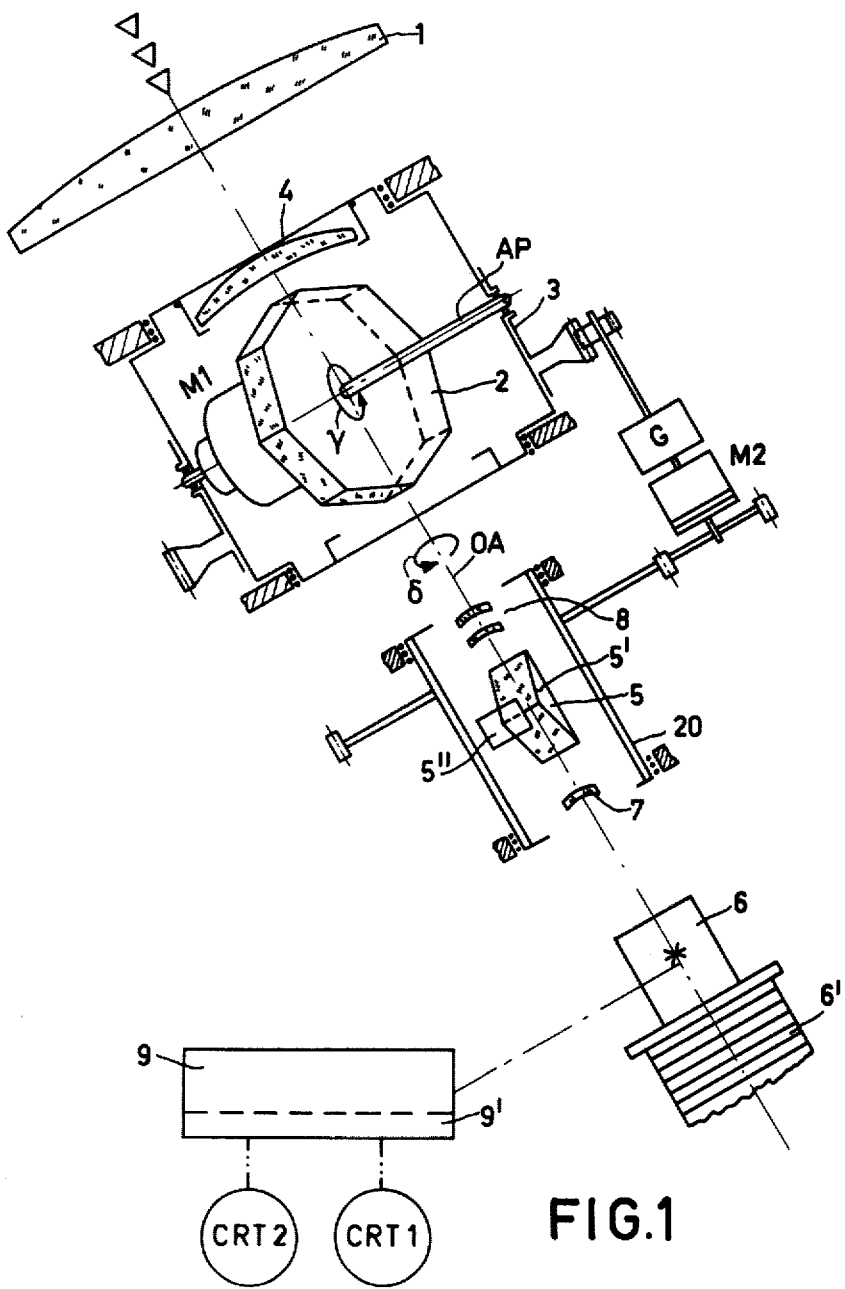
FIG. 1 schematically shows an embodiment of a thermal imaging device according to the invention.

The thermal imaging device of FIG. 1 comprises an entrance objective (1), an IR-transmitting polygonal deflection prism (2), which is rotated about its axis (AP) by means of a motor (M1) for radially scanning the image and at the same time is rotated about the optical axis (OA) for polar scanning by means of a motor (M2), and a drive mechanism (G) within a cardan suspension (3). Because of the large field of view of 10°, which is traversed in an eighth revolution of the polygonal deflection prism (2), a correction lens (4), which is rotatable about its optical axis, should be arranged immediately in front of the prism. The IR radiation may also be picked up by means of a rotatable periscope with a mirror.

Complete image deflection is performed by the polygonal deflection prism (2). By means of a rotating reversing optic (5) the image is transferred to the stationary detector (6), which is provided with a cooling assembly (6'). The reversing optic (5) comprises a reflecting prism (5') and a plane mirror (5"), which inside the tube (20) rotates about the optical axis (OA) with half the angular speed of the polygonal deflection prism (2). The reversing optic (5) is situated between a lens system (8) and a field lens (7) of an optical system which keeps the optical path through the reversing optic (5) substantially parallel and at the same time provides an additional magnification of the image on the detector (6). The multichannel detector signal is amplified and via a signal processing stage (9) is applied to a cathode-ray or picture tube (CRT 1) for reproduction (display). A second cathode-ray tube (CRT 2) may be operated in parallel. When an additional monitor (CRT 2, for example) is used, the magnification for each monitor or display may be adjusted individually, so that by means of the same thermal imaging device identification or aiming is possible and at the same time a panorama view can be obtained.

Figure 2:
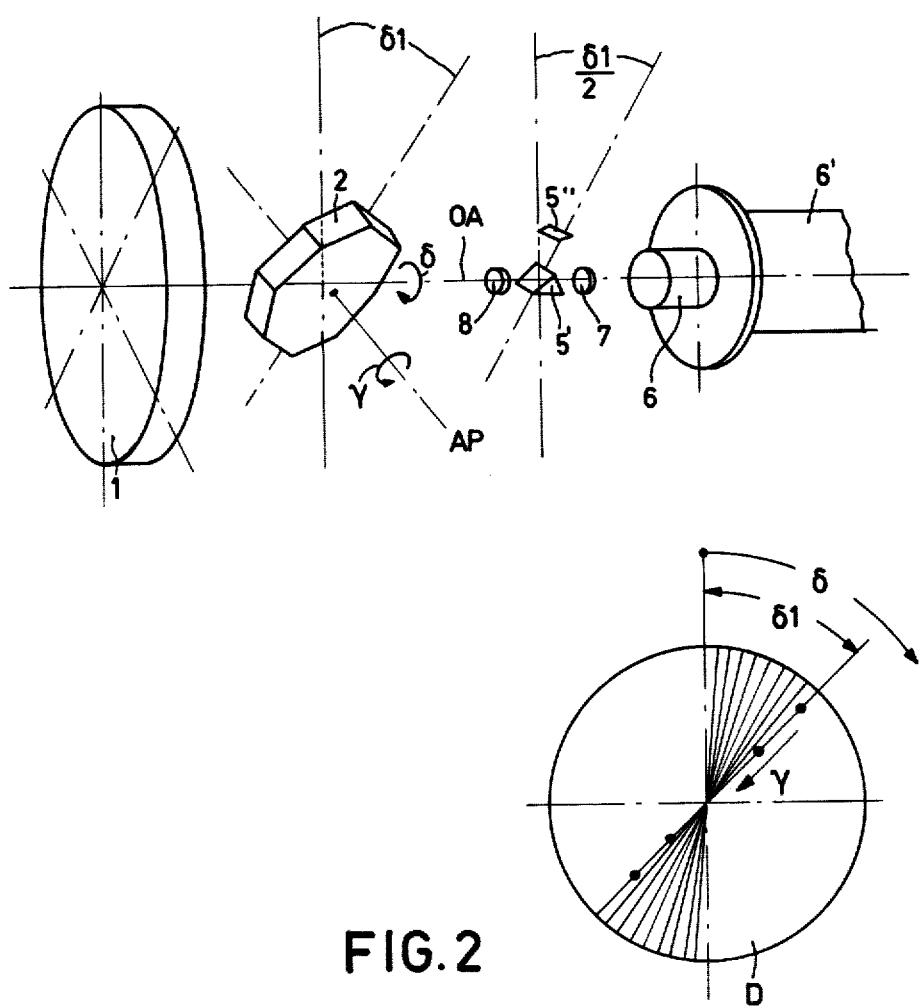
FIG. 2 schematically represents the construction of the embodiment of FIG. 1 in order to illustrate the reconstruction of the image on the display.

FIG. 2 is a perspective view illustrating the function of the compact polar scanning. The rotation about the polygon axis (AP) with the angular speed α provides the radial scanning, the rotation about the optical axis (OA) with the angular speed δ the polar scanning. The reversing optic (5) rotates about the optical axis (OA) with half the angular speed δ/2. For the display (D) the picture is then scanned using a sectorlike line scanning method which is dependent on the polygon sector angle δ1 and the angular speeds δ and α.

In principle this system is suitable both for being added to an existing sighting device and for integration in a day-night sighting device. The display is either incorporated in a periscope or via a swing arm it is coupled to the daylight sighting device.

An entrance objective (1) of 150 mm diameter and 300 mm focal length is preferred for the polar scanning described. However, in order to increase the thermal sensitivity, the objective diameter may be increased to 200 mm at fixed focal length.

Figure 4A:
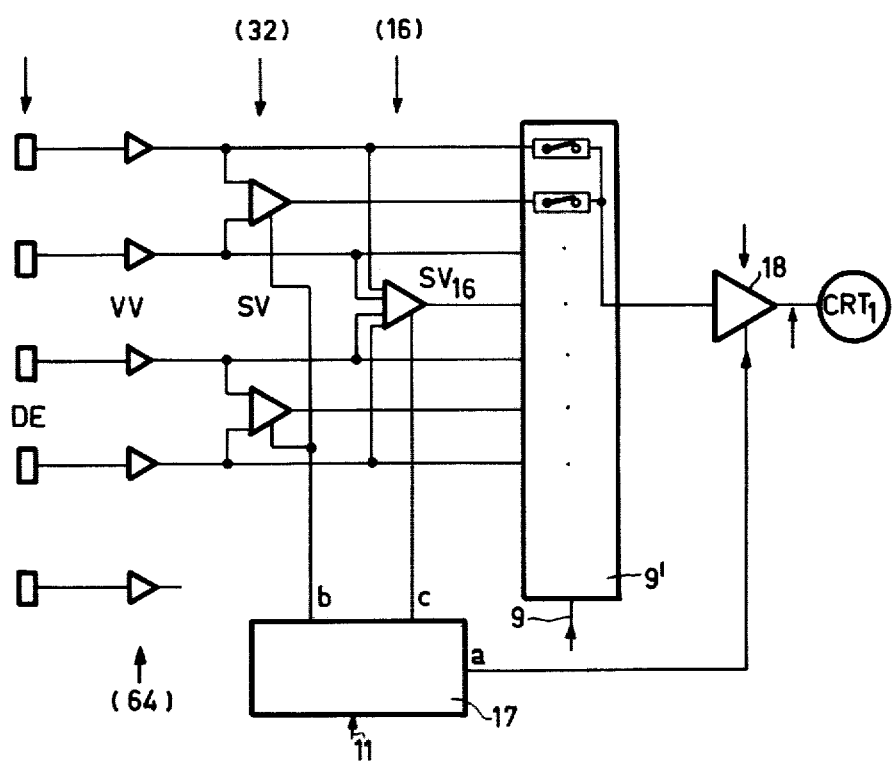
FIG. 4a is a circuit diagram relating to a signal processing arrangement for the device of FIG. 1.

The I.R. detector array may comprise 64 elements (DE) each having a surface area of $50 \times 50$ $\mu m^2$ (FIG. 4a). These elements are arranged in a linear row at a distance of 50 μm from each other. All output voltages of the elements (DE) are preamplified in parallel and applied to the multiplexer (9') of the signal processing stage (9). In the present embodiment the detector material is cooled to 77° K. A cold screen with an aperture of approximately 26° serves to increase the detection sensitivity. In the present embodiment the number of image points for one element is 2000 per diameter and 50 per circumference.

Figure 3:
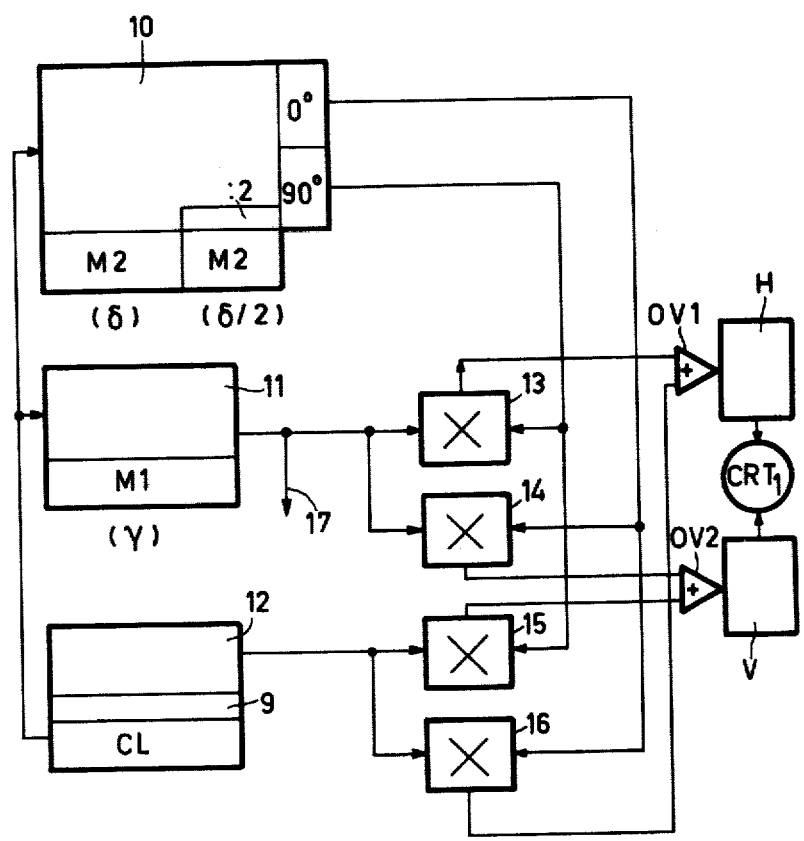
FIG. 3 is a block diagram relating to a drive control arrangement for the device of FIG. 1.

In order to display the polar-scanning image a miniature cathode ray tube (CRT 1) with magnetic deflection stages (H) and (V) an electrostatic focusing may be employed in accordance with FIG. 3. The deflection signals are generated by a sine wave generator (10) with a frequency of at least 10 Hz, a sawtooth generator (11) for example with a frequency of 60 Hz and a sawtooth generator (12) for example with a frequency of 1 MHz. The sine wave generator (10) supplies a signal at 0° and 90°. This is, for the horizontal and vertical deflection multiplied by the sawtooth from generator (11) for the radial deflection and by the sawtooth from generator (12) for the serial scanning of the detector line signals. Multiplication is by multipliers (13-16). The output voltages of the multipliers are applied in known manner via operational amplifiers (OV1 and OV2).

The sine wave generator (10) moreover synchronizes the drive (M2) of the cardan suspension (3) in which the polygonal scanning prism (2) is suspended. The reversing optic (5) is driven at half the frequency of the cardan suspension (3) and is also synchronized by the sine wave generator (10). Preferably, stepping motors or synchronous motors are employed as drive means.

The sawtooth generator (11) for the radial deflection synchronizes the drive (M1) of the polygonal scanning prism (2) about its axis (AP). A clock generator (CL) controls the multiplexer (9') for the serial scanning of the signals from the detector row (DE) and moreover it synchronizes the sine wave generator (10) and the sawtooth generator (11) as well as the sawtooth generator (12) for the detector signal scanning.

In accordance with FIG. 4a a row detector (DE), for example with 64 elements, feeds a 64-channel preamplifier (VV). All output signals are fed directly into the multiplexer (9'). Additionally, pairs of the amplified signals are each applied to a summing amplifier (SV) with reduced bandwidth and controllable gain. Furthermore, groups of four amplified signals are each applied to a 16-channel summing amplifier ($SV_{16}$) with reduced bandwidth and a gain which is also controllable by the control stage (17).

The outputs of the summing amplifiers which are connected to the multiplexer (9') each supply a signal in addition to those individual channels which they have combined.

Figure 4B:
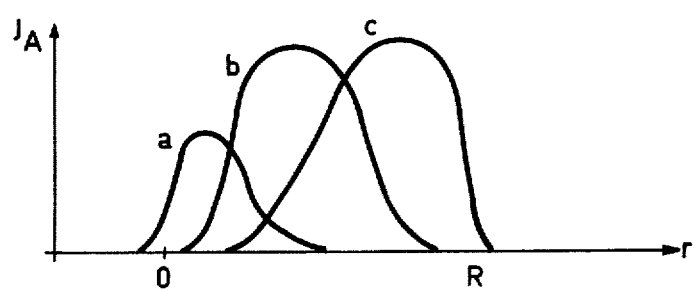
FIG. 4b is a diagram relating to the gain control arrangement for the device of FIG. 1.

The control stage (17) for gain control, synchronism with the radial deflection in r, provides periodic control signals, as schematically represented in FIG. 4b. These control signals go to the summing amplifiers via lines b and c and to the amplifier (18) connected to the multiplexer (9') via the line a for the anode current of the cathode-ray tube (CRT 1). This ensures that depending on the radius the brightness is essentially determined by the signals associated with the individual elements or by the signals obtained by summation of the individual signals with reduced bandwidth and thus with a reduced noise component. This provides a smooth transition between the fields of view with each time variable geometrical resolution. The scanning of the thermal image at many different angles in comparison with only one angle in the case of Cartesian scanning increases the identification range by at least a factor 1.5. The same applies to the recognition field of view. If with the same optical arrangement instead of the 64-element detector a 128-element detector is employed, the identification field of view is extended to 1.2° while the recognition range at 5° is increased to 3000 m. Detector arrays with even more elements, the construction of the thermal imaging device otherwise being identical, allow an additional extension of the identification and recognition fields of view or a corresponding extension of the range at the specified fields of view. As the sighting point is the zero point of the polar coordinate system and can thus be marked in a simple and reproducible manner, automatic zero adjustment may be provided. Specifically, the position of the sighting point does not depend on the overall magnification of the system. Thus, in the case of display for axis harmonization, the magnification need not constantly be maintained at 1, but may be varied continuously in a corresponding manner.

What is claimed is:

1. A thermal imaging device for detecting and identifying a thermal object, said device comprising:
    an objective system;
    a rotating, infrared radiation-transmitting scanning polygon arranged on an optical axis behind the objective system; and
    an infrared sensor array arranged on the optical axis behind the polygon such that radiation emerging from the polygon is incident on the infrared sensor array, characterized in that;
    the scanning polygon rotates about the optical axis and rotates about another axis which is perpendicular to the optical axis, said later rotation causing deflection of the infrared radiation radially with respect to the optical axis;
    the device further comprises a reversing optic arranged on the optical axis behind the polygon, said reversing optic rotating about the optical axis at half the angular frequency at which the polygon rotates about the optical axis; and
    the infrared sensor array is stationary.

2. A thermal imaging device for detecting and identifying a thermal object, said device comprising:
    an objective system;
    a rotating, infrared radiation-transmitting scanning polygon arranged on an optical axis behind the objective system;
    an infrared sensor array arranged on the optical axis behind the polygon such that radiation emerging from the polygon is incident on the infrared sensor array, said array producing electrical signals in response to the radiation; and
    a display for converting the electrical signals into optical signals, characterized in that:
    the scanning polygon rotates about the optical axis and rotates about another axis which is perpendicular to the optical axis, said latter rotation causing deflection of the infrared radiation radially with respect to the optical axis;
    the infrared sensor array is stationary; and the device further comprises:
    a correction lens, arranged on the optical axis between the objective system and the scanning polygon;
    a reversing optic, arranged on the optical axis between the polygon and the sensor array, said reversing optic rotating about the optical axis at half the angular frequency at which the polygon rotates about the optical axis;
    a multichannel summing amplifier for adding electrical signals produced by the sensor array, said amplifier producing further electrical signals;
    means for synchronizing the gain of said amplifier with the rotation of the scanning polygon about the axis perpendicular to the optical axis; and
    a picture tube for converting the electrical signals received from the amplifier into optical signals.

3. A thermal imaging device as claimed in claim 2, characterized in that:
    the display comprises at least two deflection stages; and
    the device further comprises a sine wave generator for controlling the rate of rotation of the scanning polygon around the optical axis and for controlling the polar deflection of deflection stages.

4. A thermal imaging device as claimed in claim 3, characterized in that the device further comprises a saw-tooth generator for controlling the rate of rotation of the scanning polygon around the axis perpendicular to the optical axis and for controlling the radial deflection of the deflection stages.

5. A thermal imaging device as claimed in claim 1, 2, 3 or 4, characterized in that the sensor array comprises a linear row of infrared detector elements.

* * * * *